No. 806,412. PATENTED DEC. 5, 1905.
F. W. JONES.
TELEGRAPH REPEATER.
APPLICATION FILED SEPT. 21, 1905.
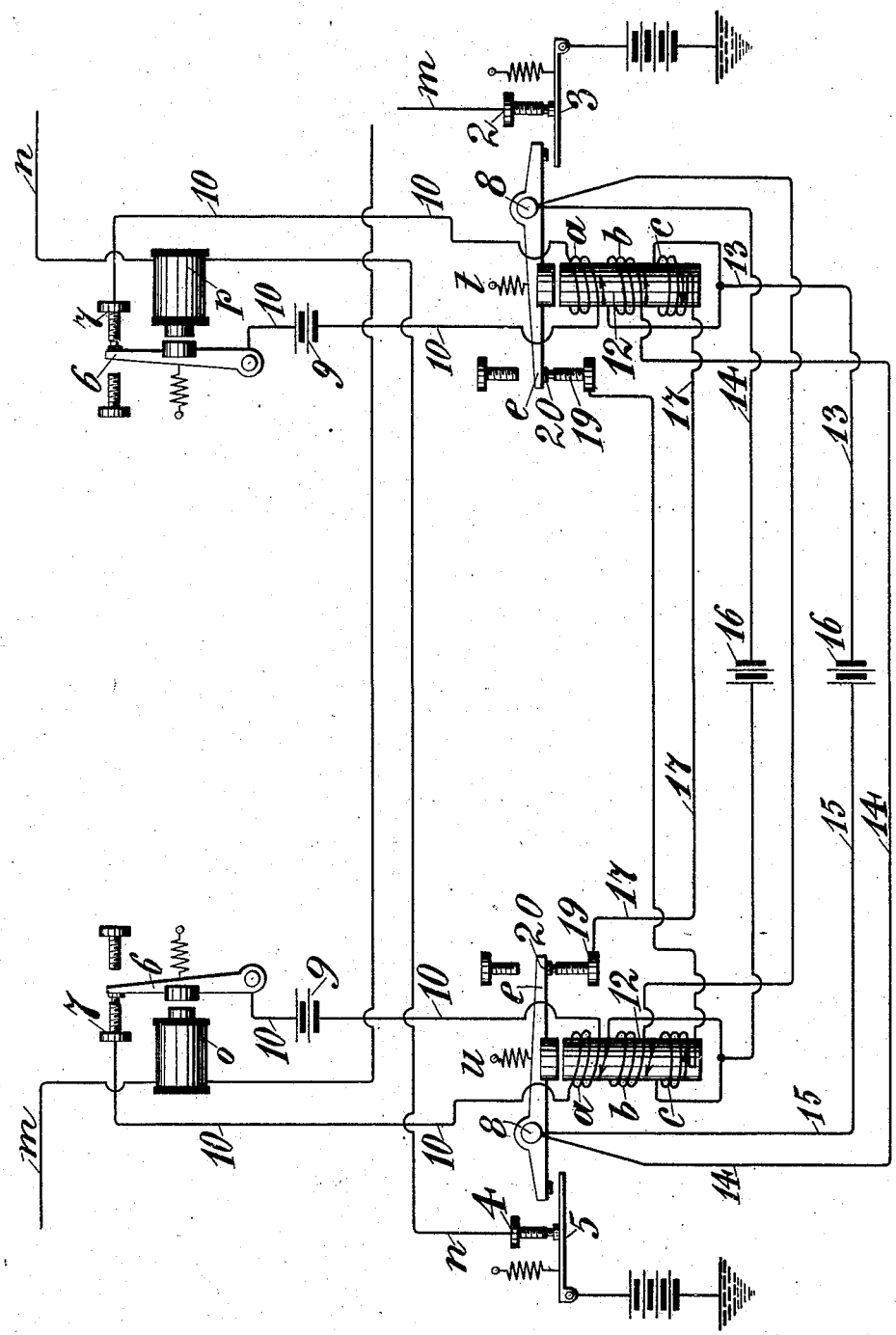
Witnesses
Francis W. Jones, Inventor
By his Attorney

UNITED STATES PATENT OFFICE.

FRANCIS W. JONES, OF NEW YORK, N. Y.

TELEGRAPH-REPEATER.

No. 806,412. Specification of Letters Patent. Patented Dec. 5, 1905.

Application filed September 21, 1905. Serial No. 279,395.

*To all whom it may concern:*

Be it known that I, FRANCIS W. JONES, a citizen of the United States, residing in the city of New York, in the county and State of New York, have made certain new and useful Improvements in Telegraph-Repeaters, of which the following is a specification.

This invention relates to automatic apparatus for interchangeably repeating current variations from one circuit to another.

The object of this invention is to increase the certainty of operation of such repeaters, to reduce the expense of the instruments, and to employ only common and well-known instruments readily modified to adapt them to such use.

The apparatus employed on each circuit consists of an ordinary relay and an electromagnetic transmitter operated by the relay. The transmitter has three coils on its single magnet. This magnet is preferably a horseshoe-magnet. One coil is in a permanently-closed local circuit. Another coil is in a local circuit controlled by the repeating-points of the relay, and the third coil is in a local circuit operated by the down contact-points of the opposite transmitter. Two of these coils affect the magnet in the same sense or direction. One coil is differential or opposed to the other two coils. The effect of the differential coil is substantially equal in its magnetizing power to either one of the other two coils, but not to both.

The accompanying drawing illustrates my invention.

$m$ is the western wire or circuit.

$n$ is the eastern wire or circuit.

$p$ is a relay of ordinary form and construction having its coils in the circuit $n$. $o$ is a similar relay in the circuit $m$.

$t$ and $u$ are the ordinary form of electromagnetic transmitter. They are substantially identical in construction and arrangement. The main-line break-points 2 3 of transmitter $t$ are in circuit $m$. The main-line break-points 4 5 of transmitter $u$ are in circuit $n$. Both circuits are connected to ground through suitable main-line generators.

The local circuits of the two transmitters are identical, and a description of one is all that is necessary. The armature-lever 6 of the relay $p$ engages the contact-stop 7 in the usual manner. 10 is a local circuit containing a local battery 9. The two terminals of circuit 10 are connected to the relay-points 6 and 7, respectively. The transmitter $t$ has an armature-bar $e$, pivoted at 8. It has a magnet 12, upon which there are three separate insulated coils $a\ b\ c$. Coil $a$ is in the local circuit 10. Coil $b$ is in a local circuit 13 14 15, containing local battery 16. Coil $c$ is in a local circuit including battery 16, conductors 13 15, break-points 19 20 of transmitter $u$, and conductor 17. The current in coils $a$ and $b$ flows in the same direction, affects magnet 12 in the same sense, and is preferably of the same strength in each coil. The current in coil $c$ is opposed to the current in coils $a$ and $b$, and the strength of current in either coil $a$ or $b$ is substantially equal to the strength of current in the coil $c$. When either coil $a$ or $b$ is closed, the magnetism due to the current in coil $c$ is neutralized.

The operation of the apparatus is as follows: When the circuit is broken or varied at the distant point on line $m$, relay $o$ releases its armature. Its local circuit is broken at points 6 7. The coil $a$ of transmitter $u$ is in open circuit. Coils $b$ and $c$ neutralize each other. Transmitter $u$ releases its armature-lever 20, breaking the local circuit 17 at 19 20, placing coil $c$ of transmitter $t$ on open circuit. The main contact-points 4 5 are immediately thereafter broken. The relay $p$ releases its armature-lever. Contact is broken at 6 7. The coil $a$ of transmitter $t$ is in open circuit; but the coil $b$ in the permanently-closed local circuit 13 14 15, containing local battery 16, retains the armature-bar of transmitter $t$ in its closed position. When the key at the distant station on circuit $m$ is closed or returned to normal condition, the operation is reversed.

What I claim, and desire to secure by Letters Patent, is—

1. The combination of two main circuits, a relay in each circuit, main-line break-points in each circuit, an electromagnetic transmitter for each break-point, and three coils on each transmitter-magnet, the first coil controlled by the break-points of the relay, the second coil in a permanently-closed local circuit and the third coil controlled by contact-points on the opposite transmitter.

2. The combination of two main circuits, a relay in each circuit, main-line break-points in each circuit, an electromagnetic device controlling each break-point and three coils on each of said magnets, a local circuit containing the first coil and the break-points of its relay, a closed local circuit containing the second coil and a local circuit containing the third coil and break-points operated by the other transmitter.

3. In a repeater the combination with one circuit of a main-line relay and an electromagnetic transmitter, main-line break-points operated by said transmitter, three controlling-coils for said transmitter, one of which is in a local circuit with the break-points of the relay, the second of which is differential and in a permanently-closed circuit, the third of which is in a local circuit with break-points controlled by the other main circuit.

4. The combination with an automatic repeater of means in one line for breaking the circuit of the other line, said means including a relay in the receiving-circuit, an electromagnetic transmitter operated by said relay, said transmitter having three controlling-coils, a local circuit including the first coil and the relay break-points; a permanently-closed local circuit containing the second coil and a local circuit containing the third coil and contact-points controlled by the transmitting-circuit.

5. In a telegraphic repeater the combination with break-points of an electromagnetic transmitter having two operating-coils and a differential coil on its magnet and a circuit-controller in the circuit of each operating-coil controlled by the two main circuits, respectively.

6. In a telegraphic transmitter the combination with main-line break-points of an operating-lever and an electromagnet controlling said lever, said magnet having two coöperating coils and a differential coil.

7. In a telegraphic repeater the combination with break-points of an electromagnetic transmitter having two operating-coils and a differential coil for controlling the operation of the transmitter-lever.

8. In a telegraphic repeater an electromagnetic transmitter having three coils on its magnet, one of which is differential with respect to the others; and means for opening the circuit of one after the other of the two last-named coils.

9. In a telegraphic repeater an electro-magnetic transmitter having three coils, a local circuit for each coil, one of which is permanently closed in combination with means for opening one circuit after the other of the two remaining.

FRANCIS W. JONES.

Witnesses:
H. R. MONAHAN,
R. C. HUDSON.